United States Patent [19]

Reynolds et al.

[11] 4,244,734
[45] Jan. 13, 1981

[54] PROCESS FOR RECOVERING METAL VALUES FROM MATERIALS CONTAINING ARSENIC

[75] Inventors: James E. Reynolds; Enzo L. Coltrinari, both of Golden, Colo.

[73] Assignee: Hazen Research, Inc., Denver, Colo.

[21] Appl. No.: 58,868

[22] Filed: Jul. 19, 1979

[51] Int. Cl.³ .................... C22B 13/04; C22B 11/04; C22B 15/08; C22B 19/22
[52] U.S. Cl. .................... 75/101 R; 75/104; 75/114; 75/115; 75/117; 75/118 R; 75/120; 75/121; 423/39; 423/87
[58] Field of Search .................... 75/101 R, 117, 121, 75/118 R, 120, 104, 115, 114; 423/39, 87

[56] References Cited

U.S. PATENT DOCUMENTS

| 803,472 | 10/1905 | Cunnington | 75/120 X |
|---|---|---|---|
| 1,331,334 | 2/1920 | Field | 75/120 X |
| 1,509,688 | 1/1924 | Parsons | 423/87 |
| 2,142,274 | 1/1939 | Kuss | 75/120 |
| 2,686,114 | 8/1954 | McGauley et al. | 75/117 X |
| 2,835,569 | 5/1958 | Reynaud et al. | 75/114 X |
| 3,687,828 | 8/1972 | Carpenter et al. | 75/120 X |
| 3,998,628 | 12/1976 | Gandon et al. | 75/104 |
| 4,063,933 | 12/1977 | Peters | 75/101 R |
| 4,149,880 | 4/1979 | Prater et al. | 75/117 |
| 4,166,737 | 9/1979 | Demarthe et al. | 75/104 |

Primary Examiner—G. Ozaki
Attorney, Agent, or Firm—Sheridan, Ross, Fields & McIntosh

[57] ABSTRACT

An improvement in hydrometallurgical recovery of metals, i.e. copper, zinc, cadmium, germanium, indium, lead, silver, gold, antimony and bismuth from materials such as flue dust containing arsenic in which the metals are selectively separated in successive process steps for final recovery, the improvement comprising precipitating arsenic as an insoluble ferric-arsenic compound in the first processing step, carrying the insoluble arsenic compound through subsequent processing steps in which it is insoluble until the other metals have been recovered leaving the ferric-arsenic compound as the final residue which can be disposed of without violating pollution requirements or converted to soluble sodium arsenate and recovered from solution by crystallization.

18 Claims, 1 Drawing Figure

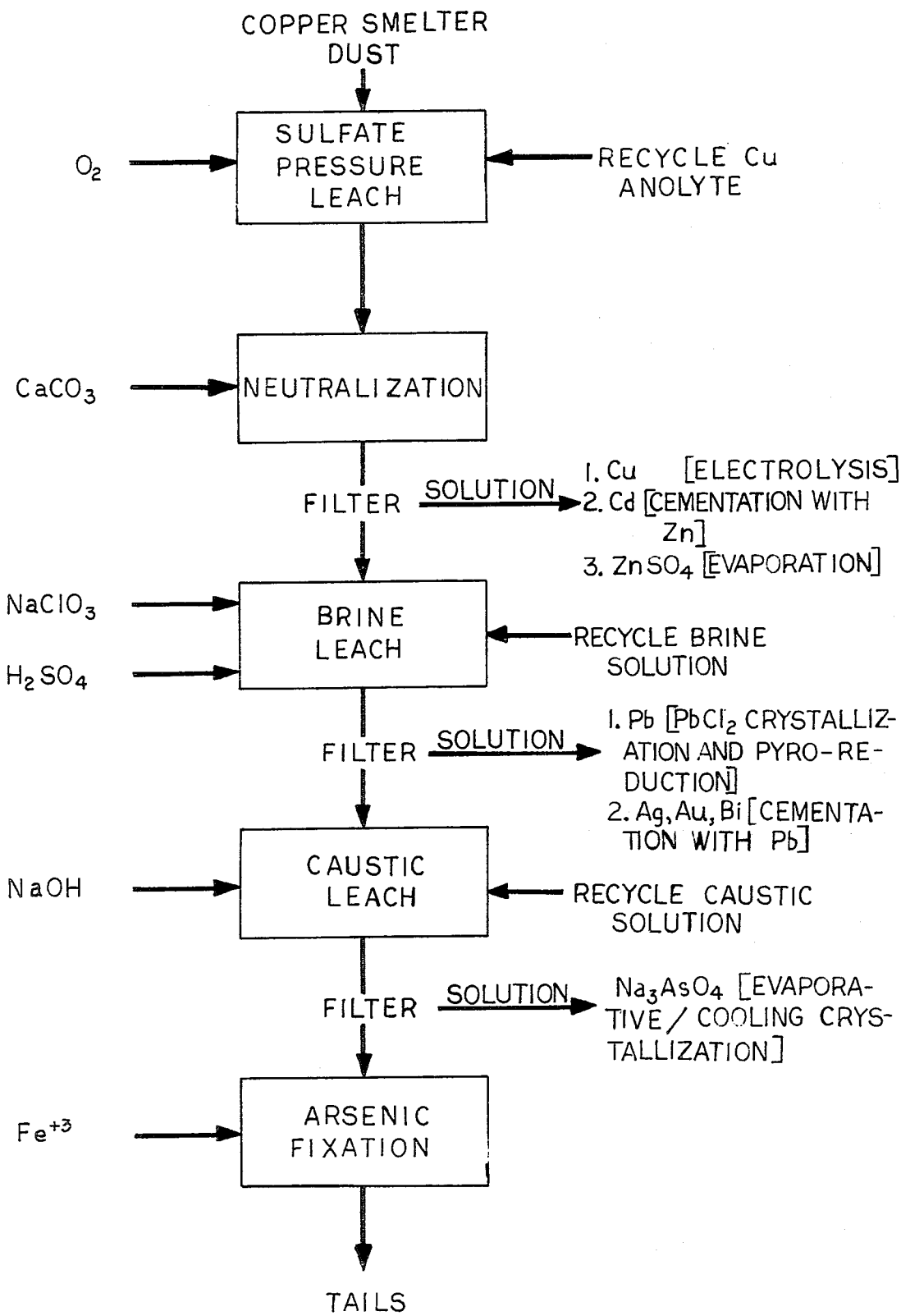

PROCESS FOR RECOVERING METAL VALUES FROM MATERIALS CONTAINING ARSENIC

DISCLOSURE OF THE INVENTION

A process is provided for recovering from a material containing arsenic at least one of the metals copper, zinc, cadmium, germanium, indium, lead, silver, gold, antimony and bismuth which comprises insolubilizing the arsenic as a ferric-arsenic compound and selectively leaching the metals for recovery. The process may be conducted in successive leach stages with arsenic being precipitated in the first stage and remaining insoluble during subsequent processing. The insoluble arsenic compound is carried throughout the successive metal recovery stages, with the result that it is isolated as a final insoluble residue which can be disposed of within environmental requirements or processed to produce a saleable arsenic compound.

The first selective metal recovery stage is an oxygen pressure leach in which copper, cadmium, zinc, germanium and indium are solubilized in a filtrate from which they are readily recoverable by conventional techniques, enough ferric ions being present in the leach to precipitate substantially all of the arsenic as a ferric-arsenic compound, and enough time being allowed to complete the precipitation. This compound is insoluble in the first and subsequent metal recovery leaches. The second leach is a brine leach which selectively solubilizes lead, silver, gold, antimony and bismuth in a solution from which these metals can be recovered. The ferric-arsenic compound is insoluble in the brine leach and remains in the final residue. Because of its high insolubility it can be disposed of in compliance with environmental requirements. Alternatively, the ferric-arsenic compound may be converted to soluble sodium arsenate in a final caustic leach. This compound can be recovered as a saleable product by crystallization.

TECHNICAL FIELD

The invention lies in the field of hydrometallurgical recovery of metals from materials containing contaminating substances such as arsenic.

BACKGROUND ART

A paper, entitled "Hydrometallurgical Recovery or Removal of Arsenic From Copper Smelter By-products" by K. Togawa, Y. Umetsu and T. Nishimura, presented at the 107th A.I.M.E. annual meeting at Denver, Colorado on Feb. 27–Mar. 2, 1978, discusses the problems involved in recovering valuable metals from copper ore refining flue dust, as well as the removal of arsenic as insoluble arsenates and as arsenic sulfide from aqueous solutions, and the hydrometallurgical recovery of arsenic trioxide from arsenic sulfide. The paper does not disclose an integrated process for the successful recovery from the flue dust of metals uncontaminated with arsenic, or the recovery of arsenic as a saleable product, nor does it disclose the other advantages or objectives of the present process.

An earlier article entitled "Recovery of Metals from the Dusts of Flash Smelting Furnace" by Eikichi Mohri and Minoru Yamada presented at the World Mining and Metals Technology Proceedings of the Denver Joint MMIJ-AIMT meeting in 1976 discloses a hydrometallurgical process for treating copper smelter dusts by leaching, precipitating some (but not all) copper with hydrogen sulfide, neutralizing to pH2 with calcium carbonate to prevent precipitation of iron arsenate during subsequent copper cementation with iron powder, and finally oxidizing the solution with blowing air to form a stable iron arsenate. This process does not overcome the necessity for handling arsenic in its dangerous soluble forms during metal recovery steps, as does the present invention, nor does it immobilize arsenic in an insoluble state early enough so that substantially complete copper recovery is possible ($H_2S$ precipitation must be halted at 2–3 grams of copper per liter of solution to avoid precipitating arsenic with the copper in this process). Niether does it provide for the recovery of arsenic in saleable form as sodium arsenate. The present process overcomes these problems and allows for substantially complete recovery of copper, zinc, cadmium, lead, and other metals, as well as sodium arsenate.

U.S. Pat. No. 4,149,880 to Prater, et al., discloses a copper cementation process following an oxygen pressure leach of the ore wherein some arsenic is insolubilized and about 0.5 to 2.0 grams per liter arsenic remain in solution. In this process, no attempt is made to insolubilize essentially all the arsenic value as is done in the present process.

U.S. Pat. No. 2,686,114 to McGauley, et al., discloses the insolubilization of arsenic values in a high pressure, high temperature ore oxidation leach using air. Arsenic is precipitated with iron in the ore and with alkaline earth metals as arsenates of these metals. The advantages of total insolubilization of arsenic with ferric ions apparently are not known to these inventors.

DESCRIPTION OF THE DRAWING

The single drawing is a generalized flow sheet showing one embodiment of the process of this invention.

BEST MODE FOR CARRYING OUT THE INVENTION

In accordance with the objective of recovering the most valuable metal products first, and processing the arsenic with the least possibility of contamination of recovered products and danger to the environment and to workers handling the materials, copper smelter flue dust is first leached under oxygen pressure with acid, preferably hot sulfuric acid, containing ferric ions to recover one or more of the following: copper, zinc, cadmium, germanium, and indium, and to precipitate arsenic as an extremely insoluble ferric-arsenic compound. Next, the residue is leached with hot brine to extract any one or more of the metal values lead, silver, gold, bismuth, and antimony, without solubilizing the arsenic. Finally, the residue is leached with hot caustic to recover arsenic as a saleable product, and the tails, after final arsenic fixation, are safely disposed to the environment. The sequential leaching process is summarized as follows:

| Leach Stage | Types | Values Leached |
|---|---|---|
| 1 | Hot $H_2SO_4$ | Cu, Zn, Cd, Ge, In |
| 2 | Hot brine | Pb, Ag, Bi, Au, Sb |
| 3 | Hot caustic | As |
| Tails | (As fixation) | Unreacted sulfides of Cu, Zn and Fe; sulfur, gold, tin, gypsum, and unreacted ferric oxides |

The process is effective with a wide range of arsenic bearing materials including flue dusts containing in excess of 10% arsenic and less than 6% iron.

In the first leach of the preferred embodiment, copper, zinc, cadmium, germanium and indium are solubilized by a sulfuric acid leach, which also solubilizes the arsenic. To avoid carrying the arsenic over into the further processing of the liquor to redeem the metal values, the arsenic is oxidized under oxygen pressure and precipitated out as an extremely insoluble ferric-arsenic compound.

The preferred method for supplying the extra ferric ions when necessary for the stoichiometry of completely insolubilizing all the arsenic present is the addition of ferrous sulfate, preferably in excess of the amounts necessary for combination with all the arsenic. The leach system is maintained in an oxidizing mode. The excess ferric ion generated insures precipitation of virtually all of the arsenic.

Although ferric iron may be present in the system in the form of hematite, the solubility of hematite is not high enough to efficiently produce the required excess of ferric ions.

The metal values to be leached are solubilized within a very short time, but because the arsenic present in the flue dust is also extremely soluble, being 50% soluble in water alone, the materials in the system must be allowed to remain in contact for over an hour: depending on temperature and pressure as well as economic requirements, from 1 to 8 hours, and more preferably from 2 to 3 hours. This extended period of time allows for the formation of the insoluble ferric arsenic compound.

An oxidizing mode is maintained at approximately $-400$ to approximately $-500$ mv (saturated calomel/platinum electrodes) with oxygen at a pressure of approximately 25 to approximately 75 psi, and more preferably, about 45 to about 55 psi, in order to oxidize the ferrous ions to their ferric state, the arsenic to its pentavalent state, and the sulfides to their more soluble sulfates.

The reaction is conducted at a temperature of between about 90° C. and about 130° C., and more preferably between about 105° C. and about 115° C.

The pH is maintained from about 0.1 to about 1.5, and preferably about 0.1 to about 1.0, preferably with sulfuric acid, to solubilize as much of the metal values as possible without dissolving the ferric-arsenic compound.

As an optional step, in order to increase the filtration rate of the leach slurry, gypsum may be generated as a filter aid in situ by partially neutralizing the slurry (from 100 to 50 g/l sulfuric acid) with calcium carbonate. This partial neutralization was shown to increase the filter rate in gpm/ft$^2$ by a factor of approximately 10. This step should be omitted if later arsenic recovery from the residue is desired, as the excess sulfate in the residue lowers arsenic recovery.

A liquid-solid separation is performed and the leach filtrate is then neutralized to pH approximately 3 by the gradual addition, with agitation, of calcium carbonate. During neutralization, the arsenic is precipitated to less than 100 parts per million, and preferably less than 10 parts per million. This arsenic appears in the gypsum cake formed during neutralization. The ferric-arsenic compound solubility product is nearly constant at this pH, and thus arsenic precipitation increases with increased ferric ion concentration in solution.

During neutralization, the temperature is permitted to reduce to between about 50° C. and about 60° C., to decrease arsenic solubility, and the materials are allowed to remain in contact for about ½ hour to allow time to aid the precipitation.

Copper, zinc, cadmium, germanium and indium are recovered from the filtrate by conventional methods, including electrowinning of the copper, with sulfuric acid produced in the copper cells being recycled to the sulfate pressure leach. Cadmium and germanium may be recovered by cementation with zinc, and zinc sulfate recovered by evaporation. Because the arsenic has been removed, the filtrate may also be recycled without metal recovery therefrom, to enrich the feed of conventional metallurgical recovery processes for copper and zinc.

The residue from the sulfate pressure leach, and the gypsum cake from the neutralization of the leach liquor containing fixed arsenic, may be safely disposed of in compliance with environmental regulations. Additional arsenic fixation with ferric ions may be preferred.

Alternatively, filtered and washed residue from the oxidizing acid leach is advanced to a brine leach to solubilize lead, silver, gold, bismuth and antimony. A hot mixed brine ($CaCl_2$+NaCl) with an oxidizing agent such as sodium chlorate, manganese dioxide, ozone or chlorine, and in the presence of ferric ions, extracts the metal values while leaving the arsenic compound undissolved.

Calcium chloride extracts lead as its chloride, which is highly soluble in the brine, from its insoluble sulfate, precipitating gypsum. The sodium chlorate or manganese dioxide (added in amounts required to adjust the emf to approximately $-700$ mv) solubilizes the gold while preventing re-leaching of the arsenic. If gold recovery is not desired, only slight oxidizing conditions need be maintained.

If there is insufficient lead in the oxidizing acid leach residue to merit recovery, the brine leach may be adjusted by reduction of the calcium chloride and the temperature in order that the lead sulfate will not be solubilized while silver, gold and bismuth values are leached. The chloride level must be sufficient so as to maintain the silver in solution.

The temperature of between about 80° C. and about 105° C., and preferably approximately 95° C.–100° C., and the pH, adjusted at approximately 0.5 with sulfuric acid, allow for maximum solubilization of the metal values with minimum arsenic extraction.

The leach materials are allowed to remain in contact for between about one-half and two hours and preferably about one hour to insure complete dissolution of the lead, in the presence of ferric ions in a concentration of about 3 g/l, added if necessary as $FeCl_3$. These additional ferric ions, in the oxidizing conditions of the leach, insure that the ferric to ferrous ratio will be high enough to prevent formation of gold and prevent re-leaching of the ferric-arsenic compound.

A liquid-solid separation is preformed, and the lead crystallized as high purity lead chloride, after which it may be reduced to elemental lead by pelletization with coke and lime at about 900° C. producing a $CaCl_2$ flux which may be recycled to regenerate the brine leach and return chloride to the system. Silver, gold, bismuth, and antimony may be cemented out of the solution with elemental lead.

Alternatively, the arsenic-free filtrate may be used to enrich feed material for processing of lead ores.

The brine leach residue, like the oxidizing acid leach residue, bearing the fixed arsenic, is safe for disposal to the environment. If necessary, additional arsenic fixation with ferric ions can be effected prior to disposal.

If arsenic is to be recovered in saleable form, the brine leach residue is leached in a caustic leach of heated, strong, basic solution, preferably a solution of approximately 50% sodium hydroxide, to extract arsenic as sodium arsenate, according to the generalized reaction $$FeAsO_4 + 3NaOH \rightarrow Na_3AsO_4 + Fe(OH)_3.$$

Excess sodium hydroxide is used. In addition to the stoichiometric amount required for the above reaction, an excess of sodium hydroxide improves the performance of the circuit, and provides for better crystallization of the sodium arsenate.

The caustic leach is conducted for one-half to two hours, and preferably about one hour to insure maximum arsenate solubilization.

It is noteworthy that where the oxidizing acid leach slurry was partially neutralized with calcium carbonate prior to filtration, arsenic recovery during the caustic leach is somewhat reduced, and thus, when arsenic recovery is to be performed on the residue, calcium carbonate neutralization should be performed on the original leach liquor after it has been separated from the arsenic-containing residue so as not to add large quantities of gypsum to the residue.

The caustic leach is performed at least 40° C. in order to solubilize the arsenate. Upper temperature limits are determined by the needs of the crystallization step.

After a liquid-solid separation, sodium arsenate of high purity is crystallized from the liquid by vacuum evaporation and cooling to approximately 25° C., while stirring, which concentrates the sodium hydroxide from about 58–79 g/l NaOH to about 154–160 g/l NaOH. The crystals are then filtered, and dried.

The excess sodium hydroxide in the liquid insures that substantially all the arsenic will be crystallized when concentrated to about 154–160 g/l NaOH at room temperature. Further concentration is unnecessary and might result in contamination of the product with crystallized sodium hydroxide.

Due to the high solubility of sodium arsenate in water, the crystals are not washed, but are dried at approximately 80° C.

The excess sodium hydroxide filtrate is recycled to the caustic leach. The caustic leach residue may be treated with additional ferric ions to fix the small amount of remaining arsenic and allow for safe disposal to the environment.

From the forgoing, it may be seen that an integrated process has been provided comprising the inventive steps of (1) a first oxidizing acid leach during which arsenic is precipitated as a highly insoluble ferric-arsenic compound, to be carried inertly through, (2) a second brine leach, and recovered in, (3) a third caustic leach. No more than 100 parts per million arsenic reports to the neutralized liquor and less than 0.5 percent reports to the leach liquor in the brine leach. The results show that the process recovers essentially all of the arsenic in the feed and that the precipitation of arsenic as a ferric-arsenic compound in the first leach prevents any contamination of the recovered metals with arsenic. All of the metals that are being removed in each leach are removed in one pass. The residue from the sulfate and brine leaches could be disposed of at the end of each leach without further leaching. For example, if economic considerations did not dictate recovery of the metals recovered in the second leach, the process could be stopped after the pressure leach and the residue from this leach disposed of without violating environmental requirements because of the high insolubility of the ferric-arsenic compound.

The brine leach might also be applied separately to various feed materials bearing lead, silver, gold, bismuth or antimony after arsenic fixation.

The caustic leach with subsequent arsenic fixation may be used to recover saleable arsenic from any feed materials comprised predominantly of ferric-arsenic compounds, at the same time allowing for safe disposal of the tails.

EXAMPLES

The following examples are descriptive, but not limiting of the invention.

1. Sulfate pressure leach:

Five-hundred (500) gram samples of copper smelter flue dust were leached in a 2-liter Parr autoclave having an impellor speed of 1550 rpm at 100° C. under an oxygen pressure of 50 psig with an oxygen bleed of 300 cc per minute (except for Test 5 where no oxygen bleed was used). The dust contained 13.9% copper, 2.05% zinc, 9.51% arsenic and 5.60% iron. Test results are summarized in Table 1.

TABLE I

| TEST NO. | 1 | 2 | 3 | 4 | | | 5 | | | 6 |
|---|---|---|---|---|---|---|---|---|---|---|
| | | | | SULFATE PRESSURE LEACH | | | | | | |
| LEACH TIME (hr.) | 2 | 2 | 2 | 1 | 2 | 3 | 1 | 2 | 3 | 2 |
| emf (mv) | — | — | 4.10 | 430 | 450 | 460 | 435 | 460 | 460 | |
| pH | — | — | 0.35 | 0.1 | | | 0.0 | | | |
| LEACH SOLUTION | | | | | | | | | | |
| g/l $H_2SO_4$ | 100 | 114 | 50 | 98 | | | 100 | | | 100 |
| g/l iron | 5$Fe^{+3}$ | 16.4$Fe^{+3}$ | 15.7 $Fe^{+3}$ | 19.8$Fe^{+2}$ | | | 20$Fe^{+2}$ | | | 34.3$Fe_2O_3$Reagent |
| RESIDUE ASSAY(%) | | | | | | | | | | |
| Cu | 1.30 | — | — | 1.79 | 1.36 | 1.30 | 1.48 | 1.24 | 1.33 | — |
| Zn | 0.25 | — | — | 12.8 | 0.23 | 0.20 | 0.27 | 0.24 | 0.23 | — |
| As | 11.2 | — | — | 12.8 | 12.9 | 13.8 | 13.4 | 13.2 | 12.8 | — |
| LIQUOR ASSAY (g/l) | | | | | | | | | | |
| Cu | 51.8 | — | 59.2 | 56.6 | 56.6 | 56.8 | 52.5 | 52.0 | 54.7 | — |
| Zn | 7.40 | — | 8.65 | 8.08 | 8.08 | 8.16 | 7.80 | 7.76 | 7.68 | — |
| As | 13.3 | 5.58 | 4.57 | 5.46 | 3.65 | 2.98 | 5.37 | 3.47 | 2.40 | 18.6 |
| $Fe^{tot}$ | .73 | 2.55 | .33 | 3.54 | 3.28 | 3.24 | — | | | — |

TABLE I-continued

| | SULFATE PRESSURE LEACH | | | | | | | | |
|---|---|---|---|---|---|---|---|---|---|
| TEST NO. | 1 | 2 | 3 | 4 | | 5 | | | 6 |
| % EXTRACTED | | | | | | | | | |
| Cu | 94.7 | — | — | 92.5 | 93.8 | 94.1 | 93.8 | 94.4 | 94.6 | — |
| Zn | 93.1 | — | — | 92.6 | 92.9 | 94.4 | 92.4 | 92.8 | 92.8 | — |
| As | 34 | 14 | 11 | 13 | 8.9 | 7.3 | 14 | 9.5 | 6.7 | 45 |

2. Neutralization:

The autoclave slurry of Example 1 is filtered and the liquor neutralized with calcium carbonate. In Test 1, prior to filtration, partial neutralization (from 100 g/l $H_2SO_4$ to 50 g/l $H_2SO_4$) is effected with calcium carbonate and in Test 2, this partial neutralization is omitted.

The partial neutralization of Test 1 precipitates gypsum which increases the filtration rate for the leach slurry from 0.013 gpm/ft$^2$ to 0.17 gpm/ft$^2$. After filtration of the slurry, the liquor is cooled to 50° to 60° C. and vigorously agitated while calcium carbonate is added in order to neutralize the solution to a pH of about 3. After one-half hour, the material is again filtered. The results of these tests are summarized in Table 2.

TABLE 2

| | NEUTRALIZATION WITH CALCIUM CARBONATE DISTRIBUTION % | | | | | | | | | |
|---|---|---|---|---|---|---|---|---|---|---|
| | TEST 1 | | | | | TEST 2 | | | | |
| PRODUCT | Cu | Zn | Cd | Ge | As | Cu | Zn | Cd | Ge | As |
| LIQUOR | 94.0 | 92.7 | 72.4 | 82 | 6.2 | 94.0 | 93.2 | 76.9 | 82 | 6.7 |
| RESIDUE | 6.0 | 7.3 | 27.6 | 18 | 93.8 | 6.0 | 6.8 | 23.1 | 18 | 93.3 |
| NEUTRALIZED LIQUOR | 93.2 | 92.7 | 71.0 | 53 | <0.03 | 92.9 | 93.1 | 72.5 | 42 | <0.03 |
| CaSO$_4$ CAKE | 0.8 | <0.1 | 1.4 | 29 | 6.2 | 1.1 | 0.1 | 4.4 | 40 | 6.7 |
| CaCO$_3$ CONSUMPTION lb/ton DUST | | 282 | | | | | 514 | | | |

3. Brine Leach:

250 grams of autoclave residue was leached with 250 g/l NaCl, 25 g/l CaCl$_2$ and 3 g/l ferric ion as FeCl$_3$.6-$H_2O$, at a temperature of 95° C. to 100° C. and a pH of 0.5, adjusted with HCl in an oxidizing mode using NaClO$_3$ to achieve an emf of −690 to −700 mv. Test 1 residues were those in which the autoclave leach slurry was partially neutralized before filtration with CaCO$_3$, as described in Example 2, and Test 2 residues were not previously treated with CaCO$_3$. Test results are summarized in Table 3.

TABLE 3

| | BRINE LEACH (DISTRIBUTION AS A PERCENTAGE OF TOTAL FLUE DUST FEED MATERIAL) | | | | | | | | | |
|---|---|---|---|---|---|---|---|---|---|---|
| | TEST 1 | | | | | TEST 2 | | | | |
| PRODUCT | As | Pb | Ag | Au | Bi | As | Pb | Ag | Au | Bi |
| LIQUOR | <0.5 | 99.5 | 83.6 | 89 | 77.7 | <0.5 | 99.2 | 85.8 | 89 | 77.8 |
| RESIDUE | 93.8 | 0.4 | 16.0 | 11 | 21.0 | 93.3 | 0.8 | 13.8 | 11 | 21.8 |

4. Caustic leach and sodium arsenate crystallization:

The residue from the brine leach described in Example 3 was leached in sodium hydroxide at 40° C. to extract arsenic as sodium arsenate. 3 grams of sodium hydroxide were used for each gram of arsenic dissolved plus an excess of 70 g/l. Test 1 residue was the result of the partially neutralized autoclave slurry described in Example 2. Test 2 was as described in Example 2. The leach slurry was then filtered and the liquid evaporated under vacuum to alter the sodium hydroxide concentration from 58–79 to 154–160 g/l NaOH, and cooled to 25° C. while stirring to crystallize sodium arsenate from the liquid. The crystals were then dried on a Buckner funnel without washing, and further dried at 80° C. Test 2 residue was derived from non-neutralized autoclave slurry residue. Test results are summarized in Table 4. The values for "Liquor" and "Residue" resulted from the caustic leach. The values for "Mother Liquor" and "Crystals" resulted from the sodium arsenate crystallization.

A further test was performed on non-neutralized residue using a leach time of 4¾ hours and an excess sodium hydroxide of 80 g/l, and resulting in 88.3% arsenic extraction.

Sodium arsenate crystals from all tests were of good purity, with only minor amounts of entrained sodium sulfate and co-crystallized tin as impurities. Bismuth and germainium, which tended to report in varying degrees to all prior leach liquors and residues, were substantially not present in the sodium arsenate crystals.

TABLE 4

| | CAUSTIC LEACH AND SODIUM ARSENATE CRYSTALLIZATION DISTRIBUTION AS A PERCENTAGE OF THE FLUE DUST FEED MATERIAL | | | | | | | |
|---|---|---|---|---|---|---|---|---|
| | TEST 1 | | | | TEST 2 | | | |
| PRODUCT | As | Bi | Sn | Ge | As | Bi | Sn | Ge |
| LIQUOR | 80.9 | 0.1 | 1.9 | <5 | 87.0 | 0.1 | 3.0 | <5 |
| RESIDUE | 12.9 | 20.9 | 94.6 | 8–18 | 6.3 | 21.7 | 92.6 | 8–18 |
| MOTHER LIQUOR | 8.4 | — | 0.1 | — | 4.9 | — | 0.1 | — |
| CRYSTALS | 72.5 | — | 1.8 | — | 82.1 | — | 2.9 | — |

5. Arsenic fixation:

Arsenic solubility in the brine and caustic leach residues, for residues initially partially neutralized before filtration of the sulfate pressure leach as described in Example 2 and for non-neutralized residues, was determined after fixing the arsenic by the addition of 2 ml 100 g/l $Fe^{+3}$ in the form of $Fe_2(SO_4)_3$ to 10 grams of residue slurried with 75 ml $H_2O$, the emf being adjusted to $-500$ mv, and the pH being adjusted to approximately 2.0 with sulfuric acid. Calcium carbonate was then added to adjust the pH to 4.0 and the mixture stirred for one hour at 25° C. The solubility of the fixed arsenic was then tested by contacting with demineralized water for up to 5 days. Test results are summarized in Table 5.

These results show extremely low arsenic solubility, even at fairly low pH, thus confirming that the brine and caustic leach residues are environmentally safe for disposal.

TABLE 5
ARSENIC FIXATION

| | pH | SOLUBILITY ppm/As |
|---|---|---|
| BRINE RESIDUE (neutralized) | | |
| Days: 0 | 4.0 | <0.3 |
| 1 | 3.4 | <0.4 |
| 4 | 3.4 | <0.3 |
| 5 | 3.5 | <0.3 |
| BRINE RESIDUE (not neutralized) | | |
| Days: 0 | 4.0 | <0.3 |
| 1 | 3.5 | <0.3 |
| 4 | 3.5 | <0.3 |
| CAUSTIC RESIDUE (neutralized) | | |
| Days: 0 | 4.0 | <0.3 |
| 3 | 3.6 | <0.3 |
| 4 | 3.7 | <0.3 |
| 5 | 3.8 | <0.3 |
| CAUSTIC RESIDUE (not neutralized) | | |
| Days: 0 | 4.0 | <0.3 |
| 3 | 3.6 | <0.3 |
| 4 | 3.8 | <0.3 |
| 5 | 3.8 | <0.3 |

We claim:

1. A process for separating arsenic from a material containing arsenic and one or more metal values selected from the group consisting of copper, cadmium, zinc and germanium, comprising:
    (a) leaching the material to solubilize arsenic and the other metal values;
    (b) contacting the leach solution with ferric ions to precipitate arsenic as a ferric-arsenic compound;
    (c) retaining the leach solution in contact with the ferric ions for a sufficient period of time to precipitate substantially all the arsenic present in solution;
    (d) performing a liquid-solid separation; and
    (e) neutralizing the liquid of step (d) to a pH of about 3 to precipitate a substantial portion of the remaining arsenic.

2. The process of claim 1 wherein the retention time of step (c) is at least one hour.

3. The process of claim 1 wherein the leach solution contains sulfate, the liquid-solid separation of step (d) is accomplished by filtration, and between steps (c) and (d) the leach materials are partially neutralized with calcium carbonate to generate gypsum.

4. A process for recovering metals selected from the group consisting of copper, cadmium, zinc, germanium, indium, antimony, bismuth, lead, silver and gold from a copper smelter flue dust containing arsenic which comprises:
    (a) leaching the flue dust with sulfuric acid at a pH of 0.1–1.5 under oxidizing conditions to convert substantially all of the arsenic to pentavalent arsenic while contacting the leach solution with ferric ions in an amount to precipitate substantially all of the arsenic as a ferric-arsenic compound and to solubilize metals selected from the group consisting of copper, zinc, cadmium, indium and germanium;
    (b) performing a liquids-solids separation on the slurry of step (a) to separate the solids from the solution;
    (c) adjusting the pH of the solution of step (b) to a pH of at least 3 to precipitate the remainder of the arsenic as ferric arsenate and reduce the arsenic content of the solution to no more than about 100 ppm;
    (d) removing the arsenic precipitate from the solution of step (c);
    (e) recovering the metals solubilized in step (a) from the solution of step (d) in substantially arsenic-free form;
    (f) leaching the residue of step (b) with a brine leach in the presence of the ferric-arsenic precipitate to solubilize metals selected from the group consisting of antimony, bismuth, lead, silver and gold;
    (g) performing a liquid-solids separation on the slurry of step (f) to separate the solids from the solution, and
    (h) recovering the metals solubilized in step (f) from the solution of step (g) in substantially arsenic-free form.

5. The process of claim 4 wherein the ferric ions of step (a) are generated during the leach from ferrous ions.

6. The process of claim 5 wherein the leach of step (a) is performed under an oxygen pressure of between about 25 and about 75 psi.

7. The process of claim 5 wherein the leach of step (a) is performed under an oxygen pressure of between about 45 and 55 psi.

8. The process of claim 4 wherein the leach of step (a) is performed at a temperature of between about 90° C. and about 130° C.

9. The process of claim 4 wherein the leach of step (a) is performed at a temperature of between about 105° C. and about 115° C.

10. The process of claim 4 wherein arsenic is recovered from the residue of step (b) by means of a hot caustic leach with subsequent crystallization of a soluble arsenic salt from the leach liquor.

11. The process of claim 4 wherein the ferric ion is oxidized in situ from ferrous sulfate added to produce ferric ion in solution in excess of stoichiometric amounts to precipitate the arsenic as a ferric-arsenic compound.

12. The process of claim 4 wherein the emf is adjusted to between about $-400$ and about $-500$ mv in the leach.

13. The process of claim 4 wherein the solids of step (b) are further processed to recover arsenic in soluble form.

14. The process of claim 13 wherein arsenic is recovered by means of the following steps:
    (a) leaching the solids of step (d) with a strong, basic solution in excess of stoichiometric amounts to solubilize the arsenic;
    (b) performing a liquid-solid separation on the material of step (a); and
    (c) crystallizing sodium arsenate from the liquid of step (b).

15. A process for recovering at least one of the metals copper, cadmium, zinc, indium and germanium from arsenic-containing flue dust resulting from the pyrometallurgical processing of copper ores comprising:
  (a) leaching the feed material with sulfuric acid at a pH approximately 0.5, at a temperature between about 90° C. and about 130° C. to dissolve the aforesaid metal values, in the presence of oxygen under pressure of between about 25 and about 75 psi to adjust the emf of the system to between about −400 and about −500 mv and sufficient ferric ions to insolubilize all the arsenic as a ferric-arsenic compound;
  (b) allowing the leach materials of step (b) to remain in contact for a period of about 1 to about 3 hours to allow precipitation of arsenic as a ferric arsenic compound;
  (c) filtering the leach materials of step (b);
  (d) neutralizing the liquid of step (c) with calcium carbonate to pH at least about 3.0 and cooling for about one-half hour to precipitate out additional arsenates;
  (e) recovering a metal value or values selected from the group comprising copper, germanium, cadmium, zinc, and indium from the liquid of step (d).

16. The process of claim 15 wherein valuable metals are recovered by means of the following additional steps:
  (f) leaching the solid residue of step (c) with a mixture of sodium chloride and calcium chloride, in the presence of ferric ions at a concentration of approximately 3 g/l ferric for about an hour at a pH of about 0.5 adjusted with sulfuric acid at a temperature of between about 95° C. and about 100° C. in the presence of an oxidizing agent to maintain the emf at up to about −700 mv, in order to solubilize at least one of the metals lead, silver, gold, bismuth and antimony, and leave the ferric-arsenic compound undissolved;
  (g) performing a liquid-solid separation on the leach materials of step (f); and
  (h) recovering at least one of the metal values from the liquid of step (g).

17. A process for recovering metals selected from the group consisting of copper, zinc, cadmium, indium and germanium from a copper smelter flue dust containing arsenic which comprises:
  (a) leaching the flue dust with sulfuric acid at a pH of 0.1–1.5 under oxidizing conditions to convert substantially all of the arsenic to pentavalent arsenic while contacting the leach solution with ferric ions in an amount to precipitate substantially all of the arsenic as a ferric-arsenic compound, and to solubilize said metals;
  (b) performing a liquid-solids separation on the slurry of step (a) to separate the solids from the solution;
  (c) adjusting the pH of the solution of step (b) to a pH of at least 3 to precipitate the remainder of the arsenic as a ferric-arsenic compound and reduce the arsenic content of the solution to no more than about 100 ppm;
  (d) removing the arsenic precipitate from the solution of step (c); and
  (d) recovering the metals solubilized in step (a) from the solution of step (b) in substantially arsenic-free form.

18. A process for recovering metals selected from the group consisting of antimony, bismuth, lead, silver and gold from a copper smelter flue dust containing arsenic which comprises:
  (a) leaching the flue dust with sulfuric acid at a pH of 0.1–1.5 under oxidizing conditions to convert substantially all of the arsenic to pentavalent arsenic while contacting the leach solution with ferric ions in an amount to precipitate substantially all of the arsenic as a ferric-arsenic compound, and to solubilize said metals;
  (b) performing a liquid-solids separation on the slurry of step (a) to separate the solids from the solution;
  (c) leaching the residue of step (b) with a brine leach in the presence of a ferric-arsenic precipitate to solubilize metals selected from the group consisting of antimony, bismuth, lead, silver and gold;
  (d) performing a liquid-solids separation on the slurry of step (c) to separate to solids from the liquids; and
  (e) recovering the metals solubilized in step (c) from the solution of step (d) in substantially arsenic-free form.

* * * * *